United States Patent [19]

Fischbeck

[11] Patent Number: 4,487,662
[45] Date of Patent: Dec. 11, 1984

[54] ELECTRODEPOSITION METHOD FOR CHECK VALVE

[75] Inventor: Kenneth H. Fischbeck, Dallas, Tex.

[73] Assignee: Xerox Corporation, Stamford, Conn.

[21] Appl. No.: 422,405

[22] Filed: Sep. 20, 1982

[51] Int. Cl.³ .................... C25D 5/02; F16K 15/16; G01D 15/18; B21D 53/00

[52] U.S. Cl. ........................................ 204/15; 346/75; 346/140 R; 137/855; 29/157.1 R

[58] Field of Search ................ 346/140 R, 75, 140 R; 137/855, 496, 517; 204/15; 29/157.1 R

[56] References Cited

U.S. PATENT DOCUMENTS

| | | | |
|---|---|---|---|
| 3,787,882 | 1/1974 | Fillmore et al. | 346/75 |
| 3,832,579 | 8/1974 | Arndt | 310/8.1 |
| 3,852,773 | 12/1974 | Sicking et al. | 346/140 R |
| 4,058,432 | 11/1977 | Schuster-Woldan et al. | 156/659 X |
| 4,159,222 | 6/1979 | Lebow et al. | 156/632 X |
| 4,233,610 | 11/1980 | Fischbeck et al. | 346/140 R |
| 4,347,524 | 8/1982 | Engel et al. | 346/140 R |
| 4,353,078 | 10/1982 | Lee et al. | 346/140 R |

FOREIGN PATENT DOCUMENTS 819652  9/1951  Fed. Rep. of Germany ...... 137/855

OTHER PUBLICATIONS

"A New Pressure-Pulsed Ink Jet Head Using a One-Way Micro-Mechanical Valve" by M. Suga and M. Tsuzuki, The First International Congress on Advances in Non-Impact Printing Technologies, SPSE, Jun. 22–26, 1981, Venice, Italy.

Primary Examiner—E. A. Goldberg
Assistant Examiner—Gerald E. Preston
Attorney, Agent, or Firm—Richard A. Tomlin

[57] ABSTRACT

A check valve for a drop-on-demand pressure pulse ejector for preventing pressure pulse loss to the liquid supply system. The check valve is made by electrodeposition onto the surface of a substrate.

1 Claim, 6 Drawing Figures

ELECTRODEPOSITION METHOD FOR CHECK VALVE

The invention relates to a check valve for a pulsed liquid droplet ejector apparatus. The invention can be utilized in any pressure pulse drop ejector apparatus; however, the greatest benefits are realized when the check valve of this invention is utilized in an ink jet recorder system. Accordingly, the present invention will be described in connection with an ink jet recording system.

In conventional drop-on-demand ink jet ejectors, a meniscus of ink is formed across a small orifice. The ink is held in the ejector by the surface tension of the ink. A pressure pulse directed through the ink to the meniscus causes a minute drop of ink to be ejected from the orifice with a velocity sufficient to cause the droplet to impact a record surface and form a mark thereon. The ink is replenished from an ink reservoir. Pressure pulse energy is lost in the transmittal of energy through the liquid toward the ink reservoir and in the viscous damping of post droplet ejection fluid oscillations. These losses can be reduced by the use of a check valve placed between the ink reservoir and the pressure pulse generating means. The pressure pulse generating means is usually an electromechanical transducer. The check valve is designed to prohibit the passage of a pressure pulse from the transducer to the ink reservoir system.

There are a number of references that disclose the use of restrictors in the ink path to reduce unwanted transmittal of pressure pulses. Further improvement, however, can be obtained through the use of a check valve. Because of the low flow rates and low flow volume that must be controlled in drop-on-demand service, the check valve must be extremely sensitive to minute pressure differences and operate in the kHz range. The check valve as claimed can be manufactured relatively simply and relatively inexpensively and is an efficient device for preventing energy loss in a drop-on-demand ink jet ejector.

The invention can best be understood by reference to the Figures, taken in conjunction with the following detailed disclosure, which describe a preferred embodiment of the present invention.

The Figures are not drawn to scale for purposes of clarity.

Figure 1:
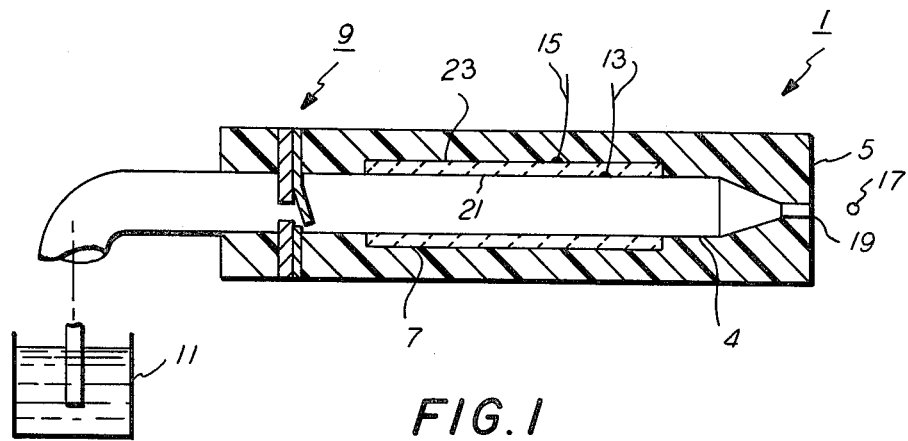
FIG. 1 is a side-sectional view of a drop-on-demand ink jet ejector incorporating the check valve of this invention.

Referring now to FIG. 1, there is shown an ink jet ejector designated generally as 1. In this exemplary instance, the ink jet ejector 1 comprises an ink channel 4 formed in ink ejector body 5. Ink channel 4 is girdled by tubular electromechanical transducer 7. A check valve, generally designated as 9, is inserted in ink channel 4. An ink reservoir 11 is used to provide ink to ink ejector 1. A source of electrical potential difference (not shown) is connected to the conductive inner 21 and outer 23 walls of electromechanical transducer 7 by electrical leads 13 and 15, respectively.

In operation ink ejector 1 is provided with ink from ink reservoir 11 by, e.g., capillary of gravitational action. When it is desired to eject a droplet 17 from orifice 19, an electrical pulse is provided to electrical leads 13 and 15, which are connected to the conductive inner surface 21 and conductive outer surface 23 of electromechanical transducer 7, respectively. Electromechanical transducer 7 is polarized such that the application of a potential difference between conductive inner surface 21 and conductive outer surface 23 causes the electromechanical transducer 7 to contract radially, squeezing the ink contained in ink channel 4. This pressure pulse is transmitted in all directions through the incompressible fluid ink. Check valve 9 is provided to prevent a significant portion of this pressure pulse from being lost into the ink feed system, including ink reservoir 11. Since the pressure pulse in a drop-on-demand ink jet ejector can occur at a rate of several kHz, the check valve 9 must have a response in the kHz range. The check valve 9 must also open in response to a pressure difference of only a small fraction of an atmospheric pressure difference across it. Preferably, the check valve 9 should be relatively inexpensive and simple to manufacture. The check valve 9 of the present invention meets those requirements.

Figure 2:
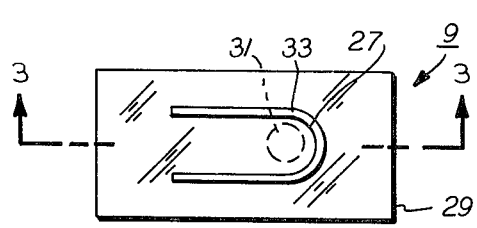
FIG. 2 is a top view of the preferred embodiment of the present invention.
Figure 3A:
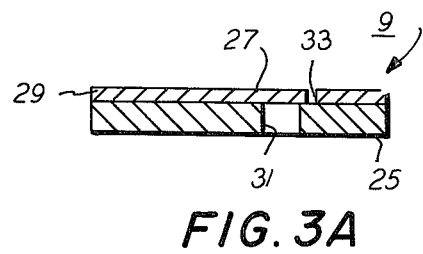
FIG. 3A is a sectional side view taken along lines 3—3 in FIG. 2.
Figure 3B:
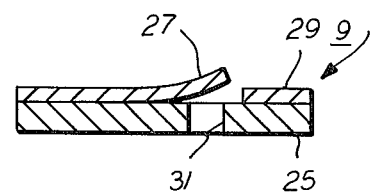
FIG. 3B is a sectional side view of the check valve of FIG. 2 showing the check valve in the open position.

Referring now to FIGS. 2, 3A and 3B, there is shown a check valve 9, which comprises a check valve substrate 25 on which the check valve microreed 27 is formed. Check valve microreed 27 is formed as an integral part of layer 29, which layer 29 and check valve microreed 27 are formed in situ by electrochemical deposition. A channel 31 is formed in substrate 25 to allow ink passage when reed 27 is in the open position as shown in FIG. 3B. Layer 29 is formed by electrochemical deposition onto substrate 25. The technique for electrochemical deposition of layer 29 onto substrate 25 to form "U"-shaped gap 33 to separate microreed 27 from the remainder of layer 29 will be disclosed in connection with FIGS. 4A and 4B.

Figure 4A:
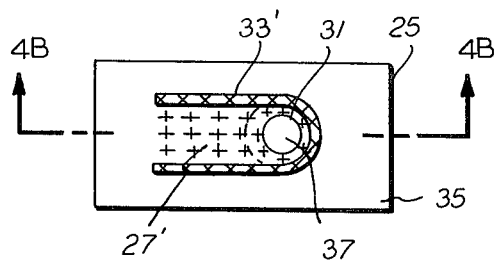
FIG. 4A shows the surface treatment pattern on the check valve substrate surface.

Referring now to FIG. 4A, there is shown a planar view of the surface 35 of substrate 25 on which layer 29, "U"-shaped gap 33 and microreed 27 are to be formed. Electrochemical deposition techniques for depositing metal onto a substrate surface are well developed as fabrication techniques. The surface 35, on which deposition is to occur, is treated in three ways. The substrate surface 35 is activated, passivated or inhibited depending on its position in relation to the desired pattern. Where the substrate surface 35 is activated, i.e., the clear area on surface 35 in FIG. 4A, the deposited metal electroplates onto the substrate 25 and attaches with a strong metallurgical bond. The surface 35 is passivated in the area 27' shown with the "+" signs. Electrodeposition in this area 27' causes the deposited layer 29 in FIGS. 3A and 3B to form a complement to the substrate surface 35, but layer 29 in area 27' does not bind itself to the substrate 25, thus forming separable microreed 27 corresponding to area 27'. In order to separate microreed 27 from the remainder of layer 29, the surface 35 is inhibited in the "U"-shaped area 33' shown as cross-hatched in FIG. 4A. No deposition occurs in "U"-shaped area 33', which forms "U"-shaped gap 33 as shown in FIGS. 2 and 3.

Figure 4B:
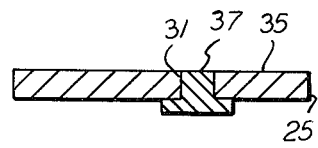
FIG. 4B shows a side-sectional view of the substrate of FIG. 4A, taken along line 4B—4B.

The first step in fabrication of microreed valve 27 is to prepare the substrate valve seat identified as 25 in FIG. 3. The substrate material may be plastic or metal and may be electrically conductive or insulating, but its upper surface, if not naturally conducting, must be made such that it will be amenable to subsequent electroforming and electroplating. The valve channel identified as 31 in FIGS. 2, 3 and 4 is formed in the substrate by drilling, punching, molding, etching or other means and filled with an electrically conductive material to form plug 37 as shown in FIG. 4B, which plug 37 may later be removed by melting, dissolving, etching. etc. Such a plug material is, for example, graphite in a fusable binder. The important property of plug 37 is that it fill the channel during the subsequent electroplating phase but be easily removable thereafter. A "hairpin" or "U"-shaped pattern identified as 33' in FIG. 4A is next formed on the surface of the substrate and encompassing the channel as shown. The pattern 33' is deposited as an electrically insulating material such as beryllia, silicon or wax; the important property being that the pattern 33' be "inhibited" from deposition of layer 29 in the subsequent electroplating operation. The remaining surface 35 of the substrate 25 is "activated" as by acid etch to facilitate deposition during that same subsequent electroplating operation. The area inside the hairpin pattern is identifed by the "+" signs and as 27' in FIG. 4A. Area 27' is next "passivated" by depositing thereon a portion of electrically conductive layer 29, which is but tenuously bonded to the substrate. This results in the formation of microreed 27 as shown in FIGS. 2 and 3 during the subsequent electroplating operation. The microreed 27 thus electroformed is easily freed from the substrate in the pattern area 27', but layer 29 is integrally bonded to the substrate 25 elsewhere. An example of such a passivating material is a thin layer of loosely adhered graphite powder. The electroplate layer 29 in FIGS. 2 and 3 is then applied, and thereafter plug 37 is removed and microreed 27 freed by ultrasonic vibration.

Electrochemical deposition of, e.g., nickel, to form layer 29 is carried out using standard plating techniques until a layer 29 of nickel approximately 25 microns thick is formed. A microreed 27 of nickel measuring one millimeter long by one-half millimeter wide and 25 microns thick will have a resonant frequency in excess of 40 kHz. Further, only a small fraction of atmospheric pressure difference across the microreed 27 will open it fully.

An advantage of the check valve 9 of this invention is that as the microreed 27 deflects, the deflection pressure diminishes as it opens, preserving the root of the microreed from exceeding the elastic limit of its material. Also, although the seal against reverse flow is metal to metal, the microreed 27 was electroformed in situ against the substrate, complementing all of its surface detail.

Although a specific embodiment and specific components have been described, it will be understood by one skilled in the art that various changes in the form and details may be made therein without departing from the spirit and scope of the invention. For example, the invention may be used with various electro- or magnetostrictive elements in place of the electromechanical transducer described herein. In particular, the benefit of the check valve of this invention may be utilized in the systems disclosed in U.S. Pat. No. 3,832,579, 3,946,398 and 4,024,544.

What is claimed is:

1. The method of forming a check valve by electrochemical deposition on a substrate for a pulsed pressure drop ejecting apparatus which comprises:
    (a) providing a substrate having a surface adapted for electrochemical deposition thereon, said substrate including a channel therethrough;
    (b) plugging said channel with a removable plug;
    (c) forming a substantially "U"-shaped pattern on said surface of said substrate encompassing said plug of a material which will inhibit electrochemical deposition;
    (d) providing on said surface of said substrate within said substantially "U"-shaped pattern of inhibiting material a passivating material which is electrically conductive and tenously bonded to said surface;
    (e) electrochemically depositing a layer on said surface and said passivating material until a deposition of the desired thickness is formed; and
    (f) removing said removable plug.

* * * * *